(12) United States Patent
Bell

(10) Patent No.: US 11,781,399 B1
(45) Date of Patent: Oct. 10, 2023

(54) SEAL ASSEMBLIES

(71) Applicant: Merle Lynn Bell, Conroe, TX (US)

(72) Inventor: Merle Lynn Bell, Conroe, TX (US)

( * ) Notice: Subject to any disclaimer, the term of this patent is extended or adjusted under 35 U.S.C. 154(b) by 0 days.

(21) Appl. No.: 18/099,079

(22) Filed: Jan. 19, 2023

(51) Int. Cl.
  *F16J 15/06* (2006.01)
  *E21B 33/10* (2006.01)

(52) U.S. Cl.
  CPC ............ *E21B 33/10* (2013.01); *F16J 15/062* (2013.01)

(58) Field of Classification Search
  None
  See application file for complete search history.

(56) References Cited

U.S. PATENT DOCUMENTS

| | | | | |
|---|---|---|---|---|
| 2,927,830 A * | 3/1960 | Workman | ............ | F16J 15/3236 92/194 |
| 3,901,517 A * | 8/1975 | Heathcott | ............ | F16J 15/3208 277/556 |
| 4,285,525 A * | 8/1981 | Held | ............ | F16J 15/004 100/154 |
| 4,592,558 A * | 6/1986 | Hopkins | ............ | F16J 15/3212 277/572 |
| 4,706,970 A * | 11/1987 | Ramirez | ............ | F16J 15/3236 277/556 |
| 5,368,312 A * | 11/1994 | Voit | ............ | F16J 15/3268 277/553 |
| 5,799,953 A * | 9/1998 | Henderson | ............ | F16J 15/3236 277/567 |
| 8,251,373 B2 * | 8/2012 | Lev | ............ | H01M 8/04201 277/456 |
| 10,054,227 B2 * | 8/2018 | Faas | ............ | F16J 15/16 |
| 2010/0052267 A1 * | 3/2010 | Castleman | ............ | F16J 15/166 277/553 |

* cited by examiner

*Primary Examiner* — Vishal A Patel
(74) *Attorney, Agent, or Firm* — Elliott Law PLLC; Douglas H. Elliott; Nathan Q. Huynh

(57) ABSTRACT

Disclosed herein are seal assemblies that may each include: a metal ring that may have a metal convex outer surface and two metal outer edges; a ring that may have a non-metal concave inner surface and two protrusions, each of the non-metal protrusions may have a surface facing one of the two metal outer edges, wherein: the metal convex outer surface may be disposed against the non-metal concave inner surface; and at least one of the two metal outer edges may be abutted against the inner surface of one of the two protrusions.

21 Claims, 6 Drawing Sheets

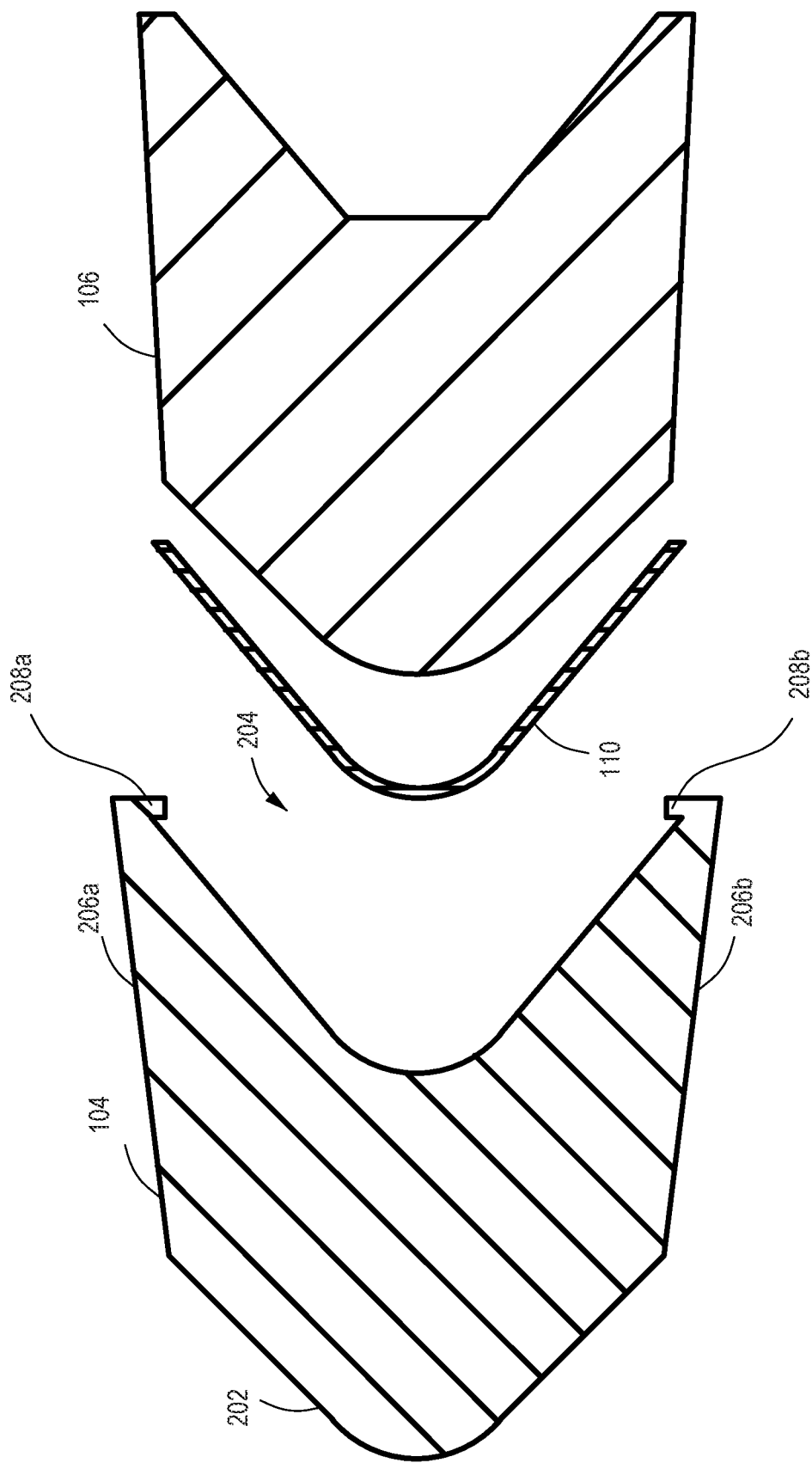

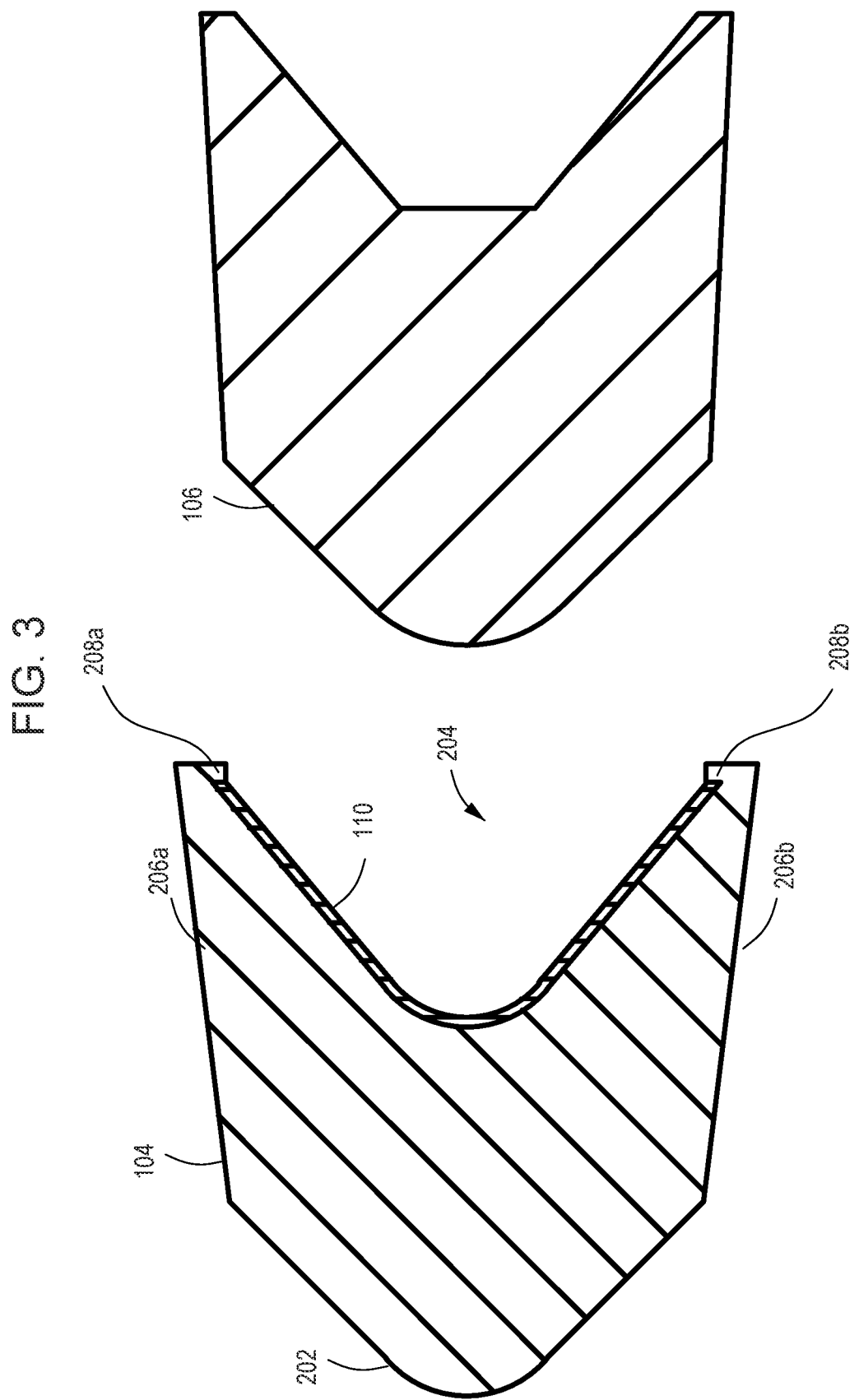

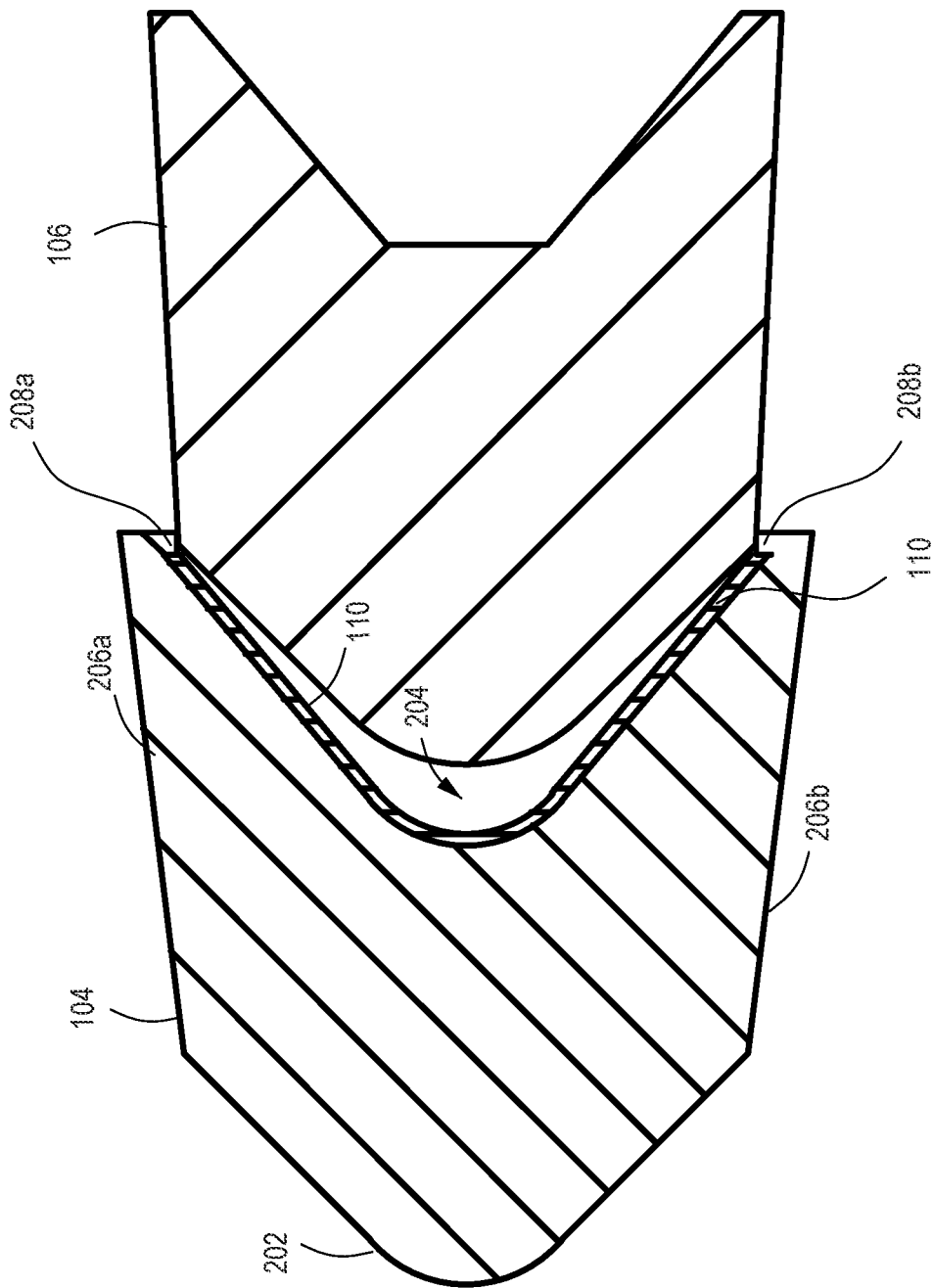

SEAL ASSEMBLIES

BACKGROUND

1. Field of Inventions

The field of this application and any resulting patent is seal assemblies and methods for sealing downhole rods.

2. Description of Related Art

Various methods for sealing downhole rods include seal assemblies. However, those methods lack the combination of steps and/or features of the methods and assemblies disclosed herein. Furthermore, it is contemplated that the methods and/or assemblies disclosed herein, including those claimed, solve problems that prior art methods and assemblies have failed to solve. Also, the methods and/or assemblies disclosed and/or claimed herein have benefits that would be surprising and unexpected to a hypothetical person of ordinary skill with knowledge of the prior art existing as of the filing date of this application.

SUMMARY

The disclosure herein includes a seal assembly, which seal assembly may include: a metal ring that may have a metal convex outer surface and two metal outer edges; a ring that may have a non-metal concave inner surface and two protrusions, each of the non-metal protrusions having a surface facing one of the two metal outer edges, wherein: the metal convex outer surface may be disposed against the non-metal concave inner surface; and at least one of the two metal outer edges may abut against the inner surface of one of the two protrusions.

Additionally, the disclosure herein includes a seal assembly, which seal assembly may include: a metal ring that may have a metal concave inner surface and a first height; and a non-metal ring that may have a non-metal convex outer surface and a second height, wherein: the metal concave inner surface may face the non-metal convex outer surface; and the first height may be greater than the second height.

Also, the disclosure herein includes a seal assembly, which seal assembly may include a first ring that may have: a first wing; a second wing; a first bracket extending from the first wing; and a second bracket extending from the second wing; an energizing ring that may have: a first energizing ring portion abutted against the first bracket; and a second energizing ring portion abutted against the second bracket; and a backup ring that may have: a first backup ring portion abutted against the first energizing ring portion; and a second backup ring portion abutted against the second energizing ring portion.

In addition, the disclosure herein includes a seal assembly, which seal assembly may include: a first ring that may have: a first forward ring surface; a second forward ring surface; a first rearward ring surface; a second rearward ring surface; a first bracket surface extending from the first rearward ring surface; and a second bracket surface extending from the second rearward ring surface; an energizing ring that may have: a first forward energizer surface abutted against the first rearward ring surface and the first bracket surface; a second forward energizer surface abutted against the second rearward ring surface and the second bracket surface; a first rearward energizer surface; and second rearward energizer surface; and a backup ring that may have: a first forward backup surface abutted against the first rearward energizer surface; and a second forward backup surface abutted against the second rearward energizer surface.

Furthermore, the disclosure herein includes a method of sealing an annular space, which method may include: providing a seal assembly that may include: a first ring that may have: a first wing; a second wing; a first bracket extending from the first wing; and a second bracket extending from the second wing; an energizing ring having: an energizing ring central axis; a first energizing ring portion abutted against the first bracket; and a second energizing ring portion abutted against the second bracket; and a backup ring that may have; a first backup ring portion abutted against the first ring portion; and a second backup ring portion abutted against the second ring portion; pushing, with the first backup ring portion, the first energizing ring portion and the first wing away from the energizing ring central axis; and pushing, with the second backup ring portion, the second energizing ring portion ring and the second wing away from the energizing ring central axis.

BRIEF DESCRIPTION OF THE DRAWINGS

FIG. 2 illustrates an exploded cross-sectional radial view of a seal ring, an energizing ring, and a backup ring.

FIG. 3 illustrates an exploded cross-sectional radial view of a seal ring, an energizing ring coupled to the seal ring, and a backup ring.

FIG. 5 illustrates a cross-sectional radial view of a backup ring having its nose abutted against an energizing ring that is coupled to a seal ring.

DETAILED DESCRIPTION

1. Introduction

Figure 1:
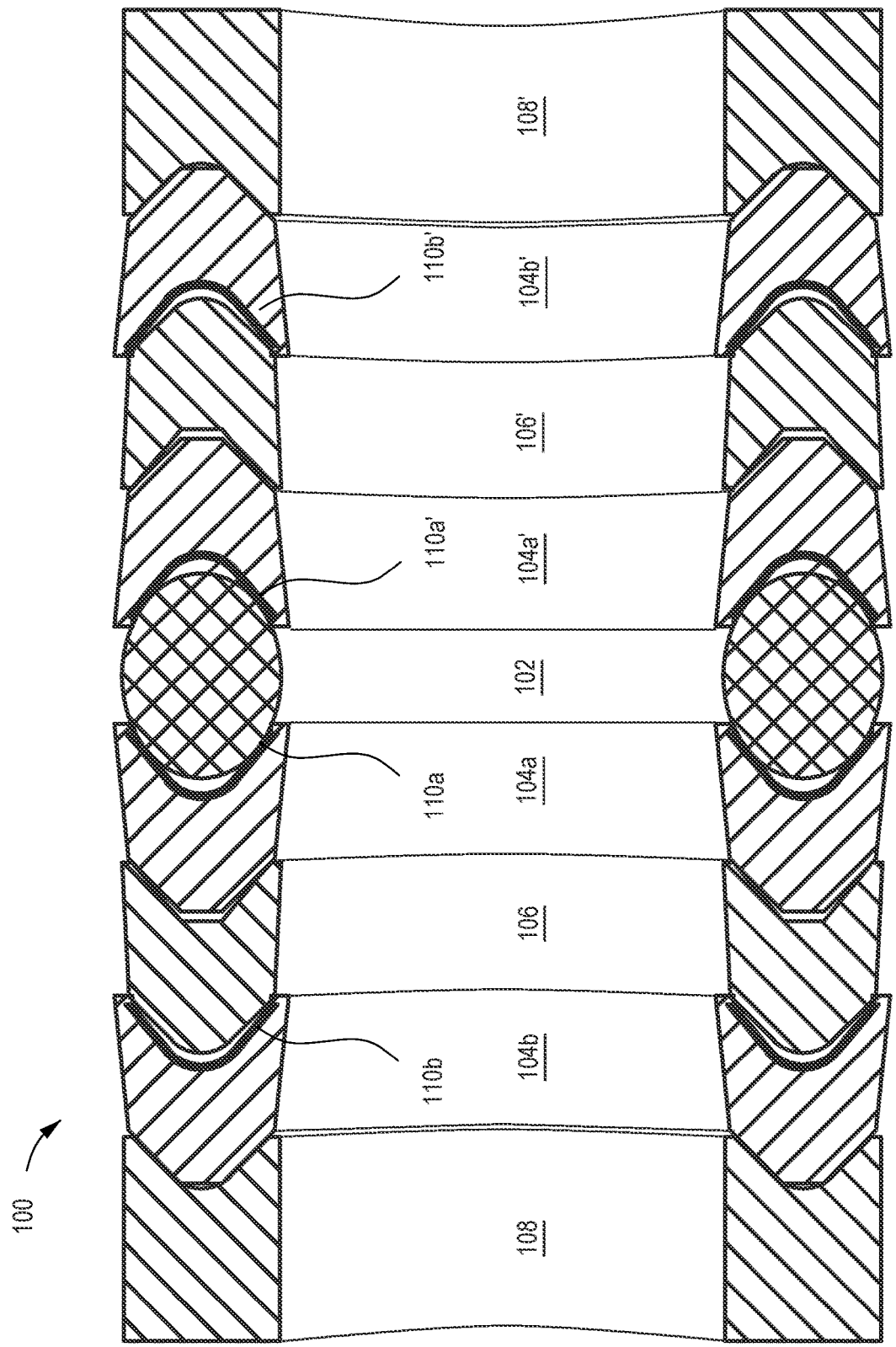
FIG. 1 illustrates a seal assembly.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist with the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "adjacent" as used herein means next to and may include physical contact but does not require physical contact.

The term "abut against" as used herein is defined as to either physically touch or press against something, directly or indirectly. After any abutting takes place with one object relative to another object, the objects may be fully or partially "abutted." For example, a first object may be abutted against a second object such that the second object is limited from moving in a direction of the first object. Thus, a backup ring may be abutted against an energizing ring and/or a seal ring. However, it is understood that when one structure or surface abuts against another structure or surface, there may or may not be physical contact between the abutting surfaces or structures, and another material or structure may be interposed between the two abutting surfaces or structures, e.g., an adhesive material, as discussed below in connection with the energizing ring and seal ring.

The term "aperture" as used herein is defined as any opening in a solid object, e.g., a ring, a seal, or some other structure. For example, an aperture may be an opening that begins on one side of the solid object and ends on the other side of the object. An aperture may alternatively be an opening that does not pass entirely through the object, but only partially passes through, e.g., a groove or indentation. An aperture can be an opening in an object that is completely circumscribed, defined, or delimited by the object itself, e.g., an aperture in or passing through a ring or a seal. Alternatively, an aperture can be an opening in the object when the object is combined with one or more other objects or structures. An aperture may receive another object and permit ingress and/or egress of the object through the aperture. Thus, an aperture of a ring may receive a shaft.

The term "assembly" as used herein is defined as any set of components that have been fully or partially assembled together. A group of assemblies may be coupled to form a larger assembly.

The term "coupled" as used herein is defined as directly or indirectly connected, attached, or integral with, e.g., part of. A first object may be coupled to a second object such that the first object is positioned at a specific location and orientation with respect to the second object. For example, an energizing ring may be coupled to a seal ring. A first object may be either permanently or removably coupled to a second object. Two objects may be "permanently coupled" to each other via adhesive, or welding, or they may be mechanically pressed together; or they may be "removably coupled" via setting atop one another, collets, screws, or nuts and bolts. Thus, a backup ring may be removably coupled to a seal ring such that the backup ring may then be uncoupled and removed from the seal ring.

The term "cylindrical" as used herein is defined as shaped like a cylinder, e.g., having straight parallel sides and a circular or oval or elliptical cross-section. Examples of a cylindrical structure or object may include a disc, a ring, a shaft, and a rod. A cylinder may be solid or hollow. A cylindrical object may be completely or partially shaped like a cylinder. Alternatively, a solid cylindrical object may have an inner surface or outer surface having a diameter that changes abruptly. A cylindrical object may have an inner or outer surface having a diameter that changes abruptly to form a flange, e.g., lip, radial face, rim, or collar.

The terms "first" and "second" as used herein merely differentiate two or more things or actions, and do not signify anything else, including order of importance, sequence, etc.

The terms "he," "she," "they," and any other personal pronouns as used herein refer to any gender interchangeably. For example, all uses of "he" encompasses "she" as well.

The term "pressure" as used herein is defined as force per unit area. Pressure may be exerted against a surface of an object, e.g., seal, backup ring, energizer ring, and O-ring.

The term "providing" as used herein is defined as making available, furnishing, supplying, equipping, or causing to be placed in position.

The term "ring" as used herein as a noun is defined as any structure having an outer circumferential edge and an aperture disposed therethrough. The ring may be a metal seal or a non-metal seal, as discussed elsewhere herein. The ring may be a flat plate, e.g., disc. A ring may be cylindrical. A ring may be solid. A ring may have one or more apertures. A ring may have a cross-sectional chevron shape formed by two radially opposed and oppositely inclined walls that converge inwardly. The walls may be unitary. The converged walls may form a concave surface that defines a crotch. Alternatively, the converged walls may form a convex surface that defines a nose. A ring may have a polygonal cross-section. An example of a polygonal cross-section may be triangular, square, rectangular, pentagonal, hexagonal, or octagonal. A ring may have an irregular cross-section. A ring may be constructed from a malleable material, e.g., elastomer, silicone, rubber, thermoplastic, polyetheretherketone, or polytetrafluoroethylene, and the term "O-ring" is a term that refers to any ring that is constructed of any such malleable material. A ring may be constructed from one or more of metallic materials, e.g., alloys, which are or may contain stainless steel, titanium, tungsten, molybdenum, nickel, tantalum, and/or other elements and compounds, preferably those that can withstand high temperatures above 300 degrees Fahrenheit.

The term "rod" as used herein as a noun is defined as a fully solid or partially solid structure configured to be coupled to a one or more seals and/or rings. Examples of a rod may include a shaft. A rod may be a cylinder. A rod may be cylindrical and elongated having a first end and a second end. A rod may be capable of being coupled to a disc and/or a ring, e.g., by welding. A rod may be removably coupled to a ring or a seal. A portion of a rod may be inserted through one or more seals and/or rings, in which the rod and the one more seals and/or rings share a central axis. A rod may be constructed from one or more materials including metal, ceramic, plastic, rubber, carbon, fiber glass, carbon fiber, and wood. A rod may have a polygonal cross-section. An example of a polygonal cross-section may be triangular, square, rectangular, pentagonal, hexagonal, or octagonal.

The term "seal" as used herein as a noun is defined as a structure capable of sealably coupling or being coupled to another structure such as an electrical cable, a housing, and/or a cap, when abutting the other structure, so as to prevent or inhibit the flow or passage of fluid between the seal and the other structure. A seal may be a ring. A seal may be deformable or deformed, e.g., by a ring or another seal, around a shaft for sealable coupling to the around a shaft. A seal may be disposed in a portion of housing or a conduit, e.g., casing, for sealable coupling to the housing or conduit. A seal may be disposed between portions of a shaft and a housing or a conduit. A seal may be constructed from a non-metal material, such as a high-dielectric material, e.g., elastomer, plastic, latex, rubber, nitrile rubber, butyl rubber, silicone, acetyl, polyamide, polytetrafluoroethylene (PTFE), polyvinyl chloride (PVC), polyvinylidene fluoride, and/or polyvinylidene difluoride (PVDF). A seal may be chevron-shaped or frusto-conical, e.g., tapered end. The term "seal" used herein used as a verb means to prevent or inhibit passage of fluid, e.g., liquid and/or gas. The term "seal assembly" when used as a noun means one or more seals that are assembled together to form a composite structure that seals, e.g., the seal assemblies depicted in the drawings.

The term "surface" as used herein is defined as any face and/or boundary of a structure. A surface may also refer to that flat or substantially flat area that is extended radially around a cylindrical structure which may, for example, be part of a base or a rod. A surface may also refer to that flat or substantially flat area extending radially around a cylindrical structure or object which may, for example, be part of a disc. A surface may have irregular contours. A surface may be formed from coupled components, e.g., a first inclined wall and a second inclined wall that is coupled to the first inclined wall. Coupled components may form irregular surfaces. A plurality of surfaces may be connected to form a polygonal cross-section. An example of a polygonal cross-section may be triangular, square, rectangular, pentagonal, hexagonal, or octagonal.

The terms "upper," "lower," "top," "bottom", "front", "back," "left," "right" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a disc may each have an upper planar surface and a lower planar surface. The term "top" as used herein means in the highest position, e.g., farthest from the ground. The term "bottom" as used herein means in the lowest position, e.g., closest to the ground. For example, a cylindrical object, e.g., disc, rod, and base may have a top portion and a bottom portion. The term "front" identifies any object or part of a particular object that is closest to a person viewing the object. The term "back" identifies any object or part of a particular object that is closest to a person viewing the object. The term "left" identifies any object or part of a particular object that is to the left of another object. The term "right" identifies any object or part of a particular object that is to the right of another object.

3. Certain Specific Embodiments

Now, certain specific embodiments are described, which are by no means an exclusive description of the inventions.

Other specific embodiments, including those referenced in the drawings, are encompassed by this application and any patent that issues therefrom.

The disclosure herein includes a seal assembly, which seal assembly may include: a metal ring that may have a metal convex outer surface and two metal outer edges; a ring that may have a non-metal concave inner surface and two protrusions, each of the non-metal protrusions having a surface facing one of the two metal outer edges, wherein: the metal convex outer surface may be disposed against the non-metal concave inner surface; and at least one of the two metal outer edges may abut against the inner surface of one of the two protrusions.

Additionally, the disclosure herein includes a seal assembly, which seal assembly may include: a metal ring that may have a metal concave inner surface and a first height; and a non-metal ring that may have a non-metal convex outer surface and a second height, wherein: the metal concave inner surface may face the non-metal convex outer surface; and the first height may be greater than the second height.

Also, the disclosure herein includes a seal assembly, which seal assembly may include a first ring that may have: a first wing; a second wing; a first bracket extending from the first wing; and a second bracket extending from the second wing; an energizing ring that may have: a first energizing ring portion abutted against the first bracket; and a second energizing ring portion abutted against the second bracket; and a backup ring that may have: a first backup ring portion abutted against the first energizing ring portion; and a second backup ring portion abutted against the second energizing ring portion.

In addition, the disclosure herein includes a seal assembly, which seal assembly may include: a first ring that may have: a first forward ring surface; a second forward ring surface; a first rearward ring surface; a second rearward ring surface; a first bracket surface extending from the first rearward ring surface; and a second bracket surface extending from the second rearward ring surface; an energizing ring that may have: a first forward energizer surface abutted against the first rearward ring surface and the first bracket surface; a second forward energizer surface abutted against the second rearward ring surface and the second bracket surface; a first rearward energizer surface; and a second rearward energizer surface; and a backup ring that may have: a first forward backup surface abutted against the first rearward energizer surface; and a second forward backup surface abutted against the second rearward energizer surface.

Furthermore, the disclosure herein includes a method of sealing an annular space, which method may include: providing a seal assembly that may include: a first ring that may have: a first wing; a second wing; a first bracket extending from the first wing; and a second bracket extending from the second wing; an energizing ring having: an energizing ring central axis; a first energizing ring portion abutted against the first bracket; and a second energizing ring portion abutted against the second bracket; and a backup ring that may have; a first backup ring portion abutted against the first ring portion; and a second backup ring portion abutted against the second ring portion; pushing, with the first backup ring portion, the first energizing ring portion and the first wing away from the energizing ring central axis; and pushing, with the second backup ring portion, the second energizing ring portion ring and the second wing away from the energizing ring central axis.

In any one of the methods or structures disclosed herein, at least a portion of the metal convex outer surface may abut against at least a portion of the non-metal concave inner surface.

Any one of the structures disclosed herein may further include an adhesive material disposed between the metal convex outer surface and the non-metal concave inner surface.

In any one of the methods or structures disclosed herein, the entire metal convex outer surface is disposed against at least a portion of the non-metal concave surface.

In any one of the methods or structures disclosed herein, the metal convex outer surface and the non-metal concave inner surface that the metal convex outer surface is disposed against may be in physical contact with one another.

In any one of the methods or structures disclosed herein, the ring may have a non-metal concave inner surface that may consist of a non-metal material.

In any one of the methods or structures disclosed herein, one or both of the protrusions may consist of non-metal material.

In any one of the methods or structures disclosed herein, one or both of the protrusions may be a unitary part of the ring having a non-metal concave inner surface.

In any one of the methods or structures disclosed herein, the metal convex outer surface may extend from one metal outer edge to the other metal edge.

In any one of the methods or structures disclosed herein, the energizing ring may be disposed between the first wing and the second wing.

In any one of the methods or structures disclosed herein, the first energizing ring portion and the second energizing ring portion may form a first angle; and the first backup ring portion and the second backup ring portion may form a second angle greater than the first angle.

In any one of the methods or structures disclosed herein, the first energizing ring portion may be abutted against the first wing.

In any one of the methods or structures disclosed herein, the second energizing ring portion may be abutted against the second wing.

In any one of the methods or structures disclosed herein, the first energizing ring portion may push against the first wing.

In any one of the methods or structures disclosed herein, the second energizing ring portion pushes against the second wing.

In any one of the methods or structures disclosed herein, the first energizing ring portion may push the first wing outward.

In any one of the methods or structures disclosed herein, the energizing second ring portion may push the second wing outward.

In any one of the methods or structures disclosed herein, the first bracket may extend towards the second bracket.

In any one of the methods or structures disclosed herein, the second bracket may extend towards the first bracket.

Any one of the methods disclosed herein may further include exposing the seal assembly to over 300 degrees Fahrenheit.

Any one of the methods or structures disclosed herein may further include after exposing the seal assembly to over 300 degrees Fahrenheit, cooling the seal assembly below 300 degrees Fahrenheit, whereby the first ring portion and the second ring portion may move towards the central axis.

In any one of the methods or structures disclosed herein, the first ring portion may be abutted against the first wing.

In any one of the methods or structures disclosed herein, the second ring portion may be abutted against the second wing.

In any one of the methods or structures disclosed herein, the first ring portion may push against the first wing.

In any one of the methods or structures disclosed herein, the second ring portion may push against the second wing.

In any one of the methods or structures disclosed herein, the first ring portion may push the first wing outward.

In any one of the methods or structures disclosed herein, the second ring portion may push the second wing outward.

4. Specific Embodiments in the Drawings

The drawings presented herein are for illustrative purposes only and do not limit the scope of the disclosure or claims. Rather, the drawings are intended to help enable one having ordinary skill in the art to make and use the assemblies and practice the methods disclosed herein.

This section addresses specific versions of seal assemblies shown in the drawings, which relate to assemblies, elements and parts that can be part of one or more seal assemblies or methods of sealing downhole rods. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

FIG. 1A is a cross-sectional view of an illustrative seal assembly 100 composed of multiple rings where the diagonal line markings show where the cut is for the cross section of the seal assembly 100, and the left and right edges of the rings are shown where there is no cross-sectional cut. The seal assembly 100 includes an O-ring 102, seal rings 104a, 104a', 104b, 104b', backup rings 106, 106', and end rings 108, 108'. The O-ring 102, the seal rings 104a, 104a', 104b, 104b', the backup rings 106, 106', and the end rings 108, 108' are stacked, e.g., aligned, so that they all share a central axis. Additionally, the stack of rings form a cylinder having an opening through which a shaft or a rod may extend along the central axis of the seal assembly 100. The seal assembly 100 shown in FIG. 1 also includes energizing rings 110a, 110a', 110b, 110b' although because of how those energizing rings are combined with the respective seal rings 104a, 145a', 104b, 104b', the edges of those energizing rings 110a, 110a', 110b, 110b' are hidden in the cross-sectional view of the seal assembly in FIG. 1.

Assuming the O-ring 102 is at the center of the stack of rings (as illustrated in FIG. 1), and the drawing in FIG. 1 is rotated so that the words "FIG. 1" are at the top, then the seal assembly 100 is regarded as being positioned horizontally so that the axis is horizontal. As such, the seal rings 104a, 104b, the backup ring 106, and the end ring 108 are disposed on the left side of the O-ring 102 and the seal rings 104a', 104b', the backup ring 106', and the end ring 108' are disposed on the right side of the O-ring 102.

The O-ring 102 has a cross-sectional profile of an oval. Each side of the oval-shaped O-ring 102 has a nose pointing in a horizontal right or left direction. Each nose has a curvature and a convex outer surface. Referring to the left side of the O-ring 102, the seal 104a is disposed adjacent to the O-ring 102, preferably at least partially abutting the O-ring 102 as depicted in FIG. 1. The left nose of the O-ring 102 is disposed in a crotch of the seal ring 104a on the right side of the seal ring 104a. That crotch of seal ring 104a has a curvature and a concave outer surface. Disposed in the crotch of the seal ring 104a is an energizing ring 110a which is preferably a metal ring. Preferably, as depicted in FIG. 1, the entire convex surface of the energizing ring 110a (the nose) is disposed against at least a portion of the concave surface of the seal ring 104a (the crotch). A first portion of the nose of the O-ring 102 is abutted against a first portion of the concave surface of the energizing ring 110a. A second portion of the nose of the O-ring 102 is abutted against a second portion of the concave surface of the energizing ring 110a.

The backup ring 106 is disposed adjacent to and to the left of the seal ring 104a. A nose of the seal ring 104a on the left side of the seal ring 104a is disposed in a crotch of the backup ring 106 on the right side of the backup ring 106. A first portion of the nose is abutted against a first portion of the backup ring 106. A second portion of the nose is abutted against a second portion of the backup ring 106. As depicted in FIG. 1, the nose of the seal ring 104a has three differently aligned surfaces, each of which is straight when the backup ring 106 is viewed as a cross-section, and the crotch of the receiving backup ring 106 has three corresponding aligned surfaces so that each of those three surfaces of the seal ring 104a abuts against the three corresponding surfaces of the backup ring 106.

The seal ring 104b is disposed adjacent to the backup ring 106. A nose of the backup ring 106 is disposed in a crotch of the seal ring 104b. Disposed in the crotch of the seal ring 104b is the nose of an energizing ring 110b. A first portion of the nose of the backup ring 106 is abutted against a first portion of the energizing ring 110b. A second portion of the nose of the backup ring 106 is abutted against a second portion of the energizing ring 110b. The relationship between the energizing ring 110b and the backup ring 104b is preferably the same as the relationship between the energizing ring 110a and the O-ring 102.

A nose of the seal ring 104b is disposed in a crotch of the end ring 108. A first portion of the nose is abutted against a first portion of the end ring 108. A second portion of the nose is abutted against a second portion of the end ring 108.

On the right side of the O-ring 102, the order of the seal rings 104a', 104b', the backup ring 106', and the end ring 108' mirror the order of rings 104a, 104b, 106, and 108 on the left side of the O-ring 102, as described above.

Force may be applied to the end rings 108, 108' to push the seal rings 104a, 104a', 104b, 104b' and the backup rings 106, 106' towards the O-ring 102.

FIG. 2 illustrates an exploded cross-sectional view of a seal ring 104, an energizing ring 110, and a backup ring 106, which correspond to the seal ring 104a, energizing ring 110a, and backup ring 106a in FIG. 1. FIG. 3 illustrates an exploded cross-sectional view of the structures in FIG. 2, in which the energizing ring 110 is coupled to seal ring 104. The seal ring 104 and the backup ring 106 are preferably each constructed from (made of) malleable and/or resilient material. More specifically, those materials may be non-metal, e.g., elastomer, silicone, rubber, thermoplastic, polyetheretherketone (PEEK), or polytetrafluoroethylene (PTFE). The energizer ring 110 is preferably metal, and may be constructed from resilient metallic materials, e.g., metallic alloys, which may contain stainless steel, titanium, tungsten, molybdenum, nickel, tantalum, and/or other elements and compounds, preferably capable of withstanding temperatures above 300 degrees Fahrenheit. Accordingly, the energizer ring 110 is capable of returning to its original shape after being deformed, e.g., having its ends pushed away from each other, and exposed to high temperatures, e.g., above 300 degrees Fahrenheit.

The seal ring 104, the energizing ring 110, and the backup ring 106 may each have surfaces that are chevron-shaped in which the V-shaped noses and crotches are either rounded or squared off as depicted in FIGS. 2 and 3. It should be understood that the direction in which the nose or crotch of the chevron points is considered the "forward" direction which is also parallel with the central axis running down the center of the seal assembly 100. Hence, a portion of any ring, e.g., seal ring 104, energizing ring 110, and/or backup ring 106, that is farthest in distance in the forward direction, relative to other portions of the ring, is considered the "forward" portion of that ring. Conversely, a portion of the any ring, e.g., seal ring 104, energizing ring 110, and backup ring 106, farther behind the forward portion is considered the "rearward" portion.

Referring to FIG. 2 and FIG. 3, the seal ring 104 has a nose 202 and a crotch 204 that form a chevron shape. A V-shaped forward surface, e.g., outer surface, of the seal ring 104 having a convex profile may be referred to herein as the nose surface. A V-shaped rearward surface, e.g., inner surface, of the seal ring 104 having a concave profile may be referred to herein as the crotch surface. Two wings 206a, 206b extend from the nose 202. The two wings 206a, 206b and the crotch surface define a crotch 204. As used herein, the wings 206a, 206b of seal ring 104 occupy the portion of the seal ring 104 between the concave rearward surface of the seal ring 104 that abuts against the energizing ring 110 and the portion of the seal ring defining the nose portion of the seal ring 104, which is similar to the nose portion of the ring 106 depicted in FIG. 4A and discussed below. Each of the two wings is defined by an imaginary horizontal plane bisecting the seal ring 104, separating ring 206a from ring 206b.

As shown in FIG. 3, each of the wings 206a, 206b preferably has a respective flange 208a, 208b, also referred to herein as a protrusion. Each of those flanges (protrusions) has a surface that extends inwardly, toward the opposing flange, from its respective wing 206a, 206b. Accordingly, the first flange 208a and the second flange 208b each preferably has at least one surface that extends toward each other, in a vertical direction, and also preferably another surface that extends in a forward direction toward the body of the seal ring 104. Thus, the first flange 208a and the second flange 208b protrudes inwardly from the two wings 206a, 206b, respectively. Furthermore, the first flange 208a and the second flange 208b are preferably unitary with the two wings 206a, 206b.

The curved, concave crotch surface of the seal ring 104 curvedly extends from the first flange 208a to the second flange 208b. The energizing ring 110 is disposed in the crotch 204.

The energizing ring 110 has a forward outer surface that is convex and defines a nose and also has a rearward outer surface that is concave and defines a crotch. The nose has a convex outer surface. Additionally, the energizer ring 110 has two outer edges. The nose of the energizing ring 110 is preferably abutted against the crotch surface of the seal ring 104, and each of the two outer edges of the energizing ring 110 is preferably abutted against one of the flanges 208a, 208b, as shown in FIG. 3. The nose and the two outer edges of the energizing ring 110 have a profile that mirrors the concave profile of the crotch surface of the seal ring 104. Accordingly, when the energizing ring 110 is disposed in the crotch 204, at least a portion of the convex outer surface of the nose of the energizer ring 110 is disposed against the concave inner surface of the seal ring 104. Additionally, at least one edge (preferably both) of the two outer edges of the energizing ring 110 is abutted against the respective flanges 208a, 208b of the seal ring 104. At least one benefit of that abutting relationship is that flanges 208a, 208b retain the energizing ring 110 tightly against the rearward surface of the seal ring 104. The flanges 208a, 208b may also inhibit the energizing ring 110 from slipping out of the crotch 204, which is contemplated to be an advantageous feature particularly in a high-pressure and/or high-temperature environment, and/or when forces are acting on the sealing assembly.

Figure 4A:
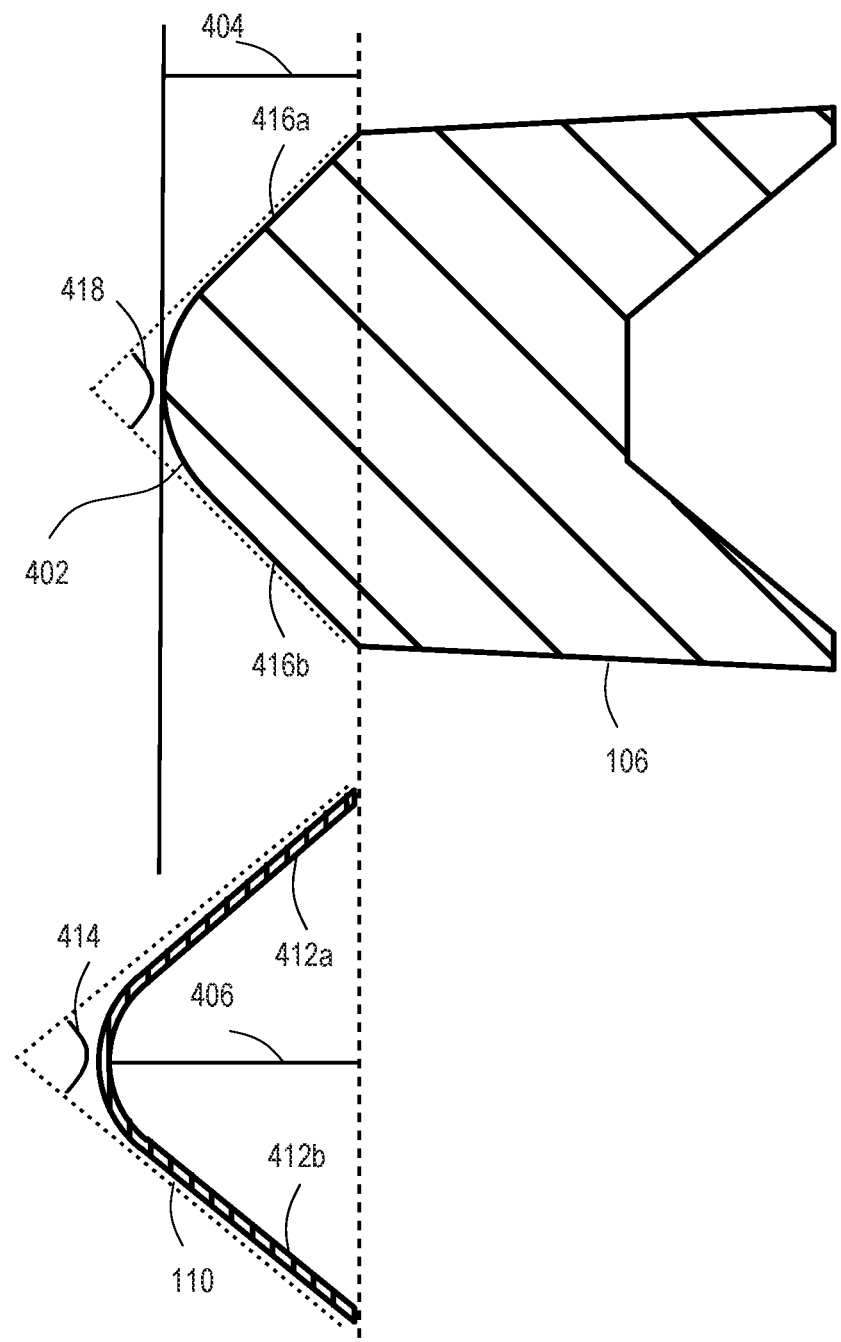
FIGS. 4A-B illustrate a cross-sectional radial view of a backup ring and an energizing ring.
Figure 4B:
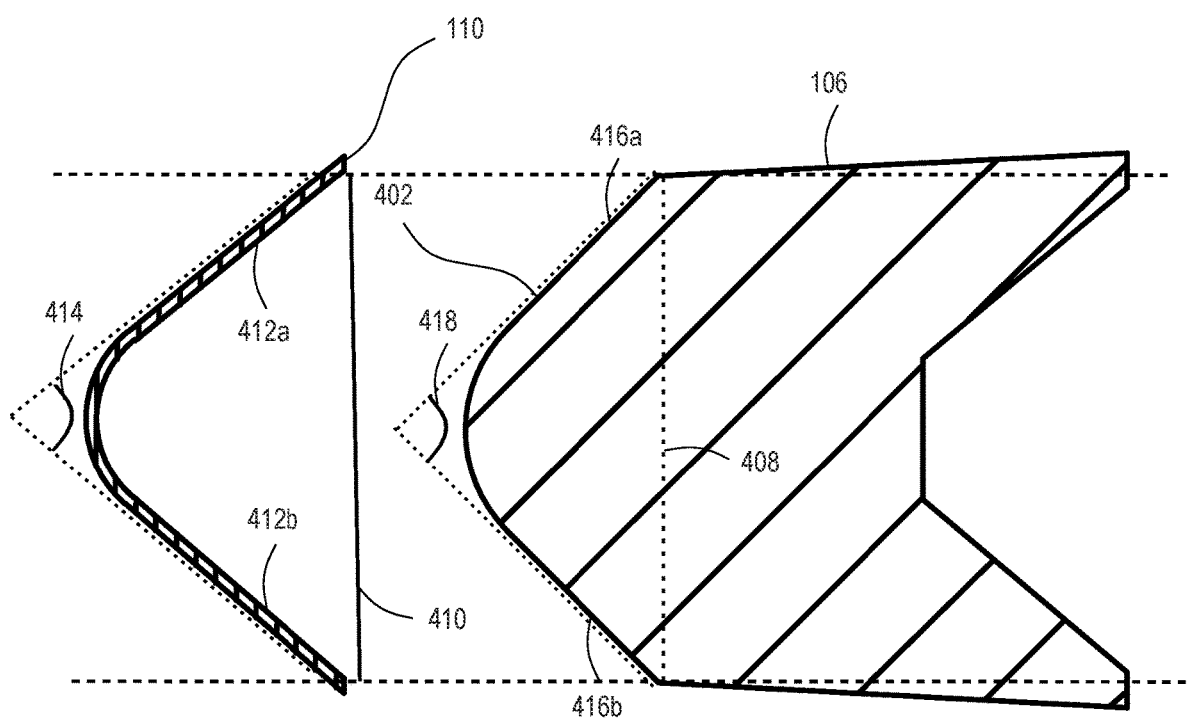

FIGS. 4A-B illustrate cross-sectional radial views of a backup ring 108 and an energizing ring 110 when the backup ring 108 and energizing ring 110 are in a relaxed state, e.g., when no axial forces are applied to actuate a seal assembly 100 combined with a shaft, e.g., sucker rod. FIG. 4A illustrates a radial width of a nose 402 ("nose width 404") of the backup ring 108 and a radial width of a crotch ("crotch width 406") of the energizing ring 110. The nose width 404 is less than the crotch width 406. FIG. 4B illustrates an axial height of the nose 402 ("nose height 408") of the backup ring 108 and an axial height the crotch ("crotch height 410") of the energizing ring 110. The nose height 408 is equal to the crotch height 410. In some cases, the nose height 408 may be greater than the crotch height 410.

Also, as seen in FIGS. 4A-B, the concave outer surface of the energizing ring 110 includes at least surfaces 412a, 412b that define an angle 414, and the convex outer surface of the nose of the backup ring 108 also includes at least two surfaces 416a, 416b that define an angle 418. As depicted in FIGS. 4A-B, when the energizing ring 110 and backup ring 108 are in a relaxed state, the angle 414 of the surfaces 412a, 412b of the energizing ring 110 is smaller than the angle 418 of the surfaces 416a, 416b of the backup ring 108. When the nose of the backup ring 108 is moved in the direction of the concave surface of the energizing ring 110, and sufficient force is applied by the backup ring 108 against the energizing ring 110, the energizing ring 110 spreads apart increasing the angle 414 between the two surfaces 412a, 412b and also causing the edges of the energizing ring 110 to push against the wings 206a, 206b and the flanges 208a, 208b (protrusions), respectively. The energizing ring 110 thus functions as a spring and shock-absorber, because, when the compressive horizontal forces recede, the energizing ring 110 returns to its original shape. As discussed elsewhere herein, the energizing ring 110 provides greater stability and longer life to the seal assembly 100, particularly in combination with the flanges 208a, 208b as discussed above.

Accordingly, referring to FIG. 4A and FIG. 4B, the angle defined by the forward surface of the nose 402 of the backup ring 108 is less than the angle defined by the rearward surface of the energizing ring 110 and the forward surface of the nose 402 has a nose height 408 less than a crotch height 410 of the energizing ring 110. Thus, when the nose 402 is disposed against the energizing ring 110, space exists between the nose 402 and a rearward surface of the energizing ring 110 (see FIG. 5). Only a first portion of the nose 402 is abutted against a first portion of the energizing ring 110 and a second portion of the nose 402 is abutted against a second portion of the energizing ring 110.

FIG. 5 illustrates a cross-sectional radial view of a backup ring 106 having a nose 402 abutted against portions of an energizing ring 110 that is disposed in a crotch 204 of a seal ring 104. The seal ring 104 includes a nose 202, a V-shaped crotch surface, and two wings 206a, 206b. The two wings and the crotch surface define the crotch 204.

Each wing 206 has a flange 208 protruding therefrom. Each flange 208 extends inwardly from its respective wing 206. Accordingly, the first flange 208a and the second flange 208b extend toward each other.

The crotch surface extends from the first flange 208a to the second flange 208b. The energizing ring 110 is disposed in the crotch 204. The energizing ring 110 has a forward surface that defines a nose and a rearward surface that defines a crotch. Moreover, the nose of the energizing ring 110 is abutted against the crotch surface of the seal ring 104. The nose of the energizing ring 110 has a profile that mirrors the crotch surface. Thus, there is no space between the energizing ring 110 and the seal ring 104.

The ends of the energizing ring 110 are abutted against the respective flanges 208a, 208b of the seal ring 104. The flanges 208a, 208b retain the energizing ring 110 tightly against the rearward surface of the seal ring 104. Furthermore, adhesive, e.g., glue or epoxy, may be applied to the crotch surface and the forward surface of the energizing ring 110 to further retain the energizing ring 110 against the seal ring 104.

A nose 402 of the backup ring 108 is disposed completely in the crotch 204 of the seal ring 104. A first portion of the nose 402 is abutted against a first portion of the energizing ring 110 and a second portion of the nose 402 is abutted against a second portion of the energizing ring 110.

Referring to FIG. 1 and FIG. 5, a seal assembly 100 may be used to inhibit fluid, e.g., hydrocarbon and/or gas, from flowing past a rod, e.g., shaft, that is disposed inside a conduit, e.g., housing or casing. The seal assembly 100 includes an O-ring 102, seal rings 104a, 104a', 104b, 104b', backup rings 106, 106', and end rings 108, 108'. The O-ring 102, the seal rings 104a, 104a', 104b, 104b', the backup rings 106, 106', and the end rings 108, 108' are stacked, e.g., aligned, so that they all share a central axis. Additionally, the stack of rings form a cylinder having an opening. A shaft (not shown) may be extended through the opening. Inner portions of the O-ring 102, seal rings 104a, 104a', 104b, 104b', backup rings 106, 106', and end rings 108, 108' may be abutted against the shaft, which would inhibit fluid from flowing between the shaft and the O-ring 102, seal rings 104a, 104a', 104b, 104b', backup rings 106, 106', and end rings 108, 108'.

Next, an operator may lower the shaft, having the seal assembly 100 disposed around it, downhole into a conduit, e.g., casing or housing (not shown). Outer portions of the O-ring 102, seal rings 104a, 104a', 104b, 104b', backup rings 106, 106', and end rings 108, 108' may be abutted against the conduit, which would inhibit fluid from flowing between the conduit and the O-ring 102, seal rings 104a, 104a', 104b, 104b', backup rings 106, 106', and end rings 108, 108'.

Afterwards, the operator may actuate the seal assembly 100 by causing pressure, e.g., force, to be applied to the end rings 108, 108'. The pressure may result from permitting fluid to flow into the conduit, from above the end ring 108 and below the end ring 108'. The pressure of fluid in the conduit may cause the end rings 108, 108' to respective push against the seal rings 104b, 104b'. The pushed seal rings 104b, 104b' may respectively push against the backup rings 106, 106'. The pushed backup rings 106, 106' may respectively push against the seal rings 104a, 104a'. The pushed seal rings 104a, 104a' may push against the O-ring 102.

The pushed O-ring 102, seal rings 104a, 104a', 104b, 104b', backup rings 106, 106', and end rings 108, 108' may deform in radial directions against the conduit and the shaft. More portions of the O-ring 102, seal rings 104a, 104a', 104b, 104b', backup rings 106, 106', and end rings 108, 108' may push against the conduit and shaft. Accordingly, greater inhibition of fluid flow between the conduit, the shaft, the O-ring 102, seal rings 104a, 104a', 104b, 104b', backup rings 106, 106', and end rings 108, 108' may occur.

Additionally, the pushed O-ring 102, seal rings 104a, 104a', 104b, 104b', backup rings 106, 106', and end rings 108, 108' may deform in an axial direction along the length of the conduit and the shaft. More portions of the end rings 108, 108' may respectively be pushed against the seal rings 104b, 104b'. More portions of the seal rings 104b, 104b' may be respectively pushed against the backup rings 106, 106'. More portions of the backup rings 106, 106' may be respectively pushed against the seal rings 104a, 104a'. More portion of the seal rings 104a, 104a' may push against the O-ring 102. Accordingly, greater inhibition of fluid flow between the O-ring 102, seal rings 104a, 104a', 104b, 104b', backup rings 106, 106', and end rings 108, 108' may occur.

Furthermore, in the case of the backup rings 106, 106' being respectively pushed against the seal rings 104b, 104b', each backup rings 106 has a nose 402 that may be pushed against an energizing ring 110 of each seal ring 104. The nose 402 has nose width 404, e.g., radial width, less than a crotch width 406, e.g., radial width, of the energizing ring 110. Hence, the nose may be pushed deeper into a crotch of the energizing ring 110, causing portions of the energizing ring 110 to push wings 206a, 206b of the seal ring 104 away from each other. The pushed wings 206a, 206b may push against the conduit and shaft to inhibit fluid flow therethrough.

Each seal ring 104 may experience alternating periods of high heat and pressure and periods of cooling and low pressure. A consecutive period of high heat and pressure and a period of cooling and low pressure is called a thermal cycle. The changes in heat and pressure would cause the seal 104 to expand and contract accordingly. Over time, those expansions and contractions may cause the seal ring 104 to deform and/or shrink. The energizing ring 110 helps to reduce deformation of the seal ring 104 and/or to retain contact of the wings 206a, 206b against the energizing ring 110. The energizing ring 110 is constructed of resilient material, e.g., metal, such that the energizing ring 110 returns to its original shape despite exposure to high heat and pressure. Thus, as the seal ring 104 and the energizing ring 110 are cooled, after exposure to high temperature, and the seal ring 104 would shrink against the cooling energizing ring 110. The wings 206a, 206b of the seal ring 104 has flanges 208a, 208b that are abutted against respective ends of the energizing ring 110. The flanges 208a, 208b retain the energizing ring 110 tightly against the rearward surface of the seal ring 104. returns to its original shape. As the cooling energizing ring 110 returns to its original shape, it would cause, e.g., pull, the wings 206a, 206 and the flanges 208a, 208b of the seal ring 104 towards their original position.

What is claimed as the invention is:

1. A seal assembly, comprising:
   an O-ring having an O-ring nose that has a convex surface;
   a metal ring having:
      a metal convex outer surface;
      two metal outer edges;
      a first rearward energizer surface abutted against the O-ring nose; and
      a second rearward energizer surface abutted against the O-ring nose;
   a first ring having:
      a ring nose that has a convex surface;
      a non-metal concave inner surface and two protrusions, each of the non-metal protrusions having an inner surface facing one of the two metal outer edges of the metal ring, wherein:
         the metal convex outer surface of the metal ring is disposed against the non-metal concave inner surface; and
         at least one of the two metal outer edges abuts against the inner surface of one of the two protrusions; and
   a backup ring having:
      a first rearward backup ring surface abutted against the ring nose; and
      a second rearward backup ring surface abutted against the ring nose;
   wherein the first rearward backup ring surface and the second rearward backup ring surface define a V-shaped surface.

2. The seal assembly of claim 1, wherein at least a portion of the metal convex outer surface abuts against at least a portion of the non-metal concave inner surface.

3. The seal assembly of claim 2, additionally comprising an adhesive material disposed between the metal convex outer surface and the non-metal concave inner surface.

4. The seal assembly of claim 1, wherein the entire metal convex outer surface is disposed against at least a portion of the non-metal concave surface.

5. The seal assembly of claim 1, wherein the metal convex outer surface and the non-metal concave inner surface that the metal convex outer surface is disposed against are in physical contact with one another.

6. The seal assembly of claim 1, wherein the ring having a non-metal concave inner surface consists of a non-metal material.

7. The seal assembly of claim 1, wherein one or both the protrusions consists of non-metal material.

8. The seal assembly of claim 1, wherein one or both of the protrusions is a unitary part of the ring having a non-metal concave inner surface.

9. The seal assembly of claim 1, wherein the metal convex outer surface extends from one metal outer edge to the other metal edge.

10. A seal assembly, comprising:
   an O-ring having an O-ring nose that has a convex surface;
   a first ring having:
      a first ring nose that has a convex surface;
      a first wing;
      a second wing;
      a first bracket extending from the first wing of the first ring; and
      a second bracket extending from the second wing of the first ring;
   a first energizing ring made of metal having:
      a first energizing portion abutted against the first bracket and the O-ring nose; and
      a second energizing portion abutted against the second bracket and the O-ring nose;
   a backup ring having:
      a backup ring nose that has a convex forward surface;
      a first backup ring portion abutted against the first energizing portion of the first energizing ring; and
      a second backup ring portion abutted against the second energizing portion of the first energizing ring;
      a first rearward backup ring portion abutted against the first ring nose; and
      a second rearward backup ring portion abutted against the first ring nose;

wherein the first rearward backup ring portion and the second rearward backup ring portion define a V-shaped surface;
a second ring having:
  a second ring nose that has a convex surface;
  a first wing;
  a second wing;
  a first bracket extending from the first wing of the second ring; and
  a second bracket extending from the second wing of the second ring;
a second energizing ring made of metal having:
  a first energizing portion abutted against the backup ring nose; and
  a second energizing portion abutted against the backup ring nose.

11. The seal assembly of claim 10, wherein the energizing ring is disposed between the first wing and the second wing.

12. The seal assembly of claim 10, wherein the first energizing ring portion and the second energizing ring portion form a first angle; and wherein the first backup ring portion and the second backup ring portion form a second angle greater than the first angle.

13. The seal assembly of claim 10, wherein the first energizing ring portion is abutted against the first wing.

14. The seal assembly of claim 10, wherein the second energizing ring portion is abutted against the second wing.

15. The seal assembly of claim 10, wherein the first energizing ring portion pushes against the first wing.

16. The seal assembly of claim 10, wherein the second energizing ring portion pushes against the second wing.

17. The seal assembly of claim 10, wherein the first energizing ring portion pushes the first wing outward.

18. The seal assembly of claim 10, wherein the energizing second ring portion pushes the second wing outward.

19. The seal assembly of claim 10, wherein the first bracket extends towards the second bracket.

20. The seal assembly of claim 10, wherein the second bracket extends towards the first bracket.

21. A seal assembly, comprising:
an O-ring having an O-ring nose that has a convex surface;
a first ring having:
  a first ring nose that has a convex surface;
  a first rearward ring surface;
  a second rearward ring surface;
  a first bracket surface extending from the first rearward ring surface of the first ring; and
  a second bracket surface extending from the second rearward ring surface of the first ring:
a first energizing ring made of metal having:
  a first forward energizer surface abutted against the first rearward ring surface of the first ring and the first bracket surface of the first ring;
  a second forward energizer surface abutted against the second rearward ring surface of the first ring and the second bracket surface of the first ring;
  a first rearward energizer surface abutted against the O-ring, nose; and
  a second rearward energizer surface abutted against the O-ring nose;
a backup ring having:
  a backup ring nose that has a convex forward surface;
  a first rearward backup ring surface abutted against the first ring nose; and
  a second rearward backup ring surface abutted against the first ring nose:
wherein a first rearward backup ring surface and the second rearward backup ring surface define a V-shaped surface;
a second ring having:
  a second ring nose that has a convex surface;
  a first rearward ring surface;
  a second rearward ring surface,
  a first bracket surface extending from the first rearward ring surface of the second ring; and
  a second bracket surface extending from the second rearward ring surface of the second ring; and
a second energizing ring made of metal having:
  a first forward energizer surface abutted against the first rearward ring surface of the second ring and the first bracket surface of the second ring;
  a second forward energizer surface abutted against the second rearward ring surface of the first ring and the second bracket surface of the second ring;
  a first rearward energizer surface abutted against the backup ring nose; and
  a second rearward energizer surface abutted against the backup ring nose.

* * * * *